Oct. 4, 1960   R. H. KUSHLER ET AL   2,954,998
MOTOR VEHICLE STUB FRAME BODY
Filed Aug. 4, 1958   8 Sheets-Sheet 1
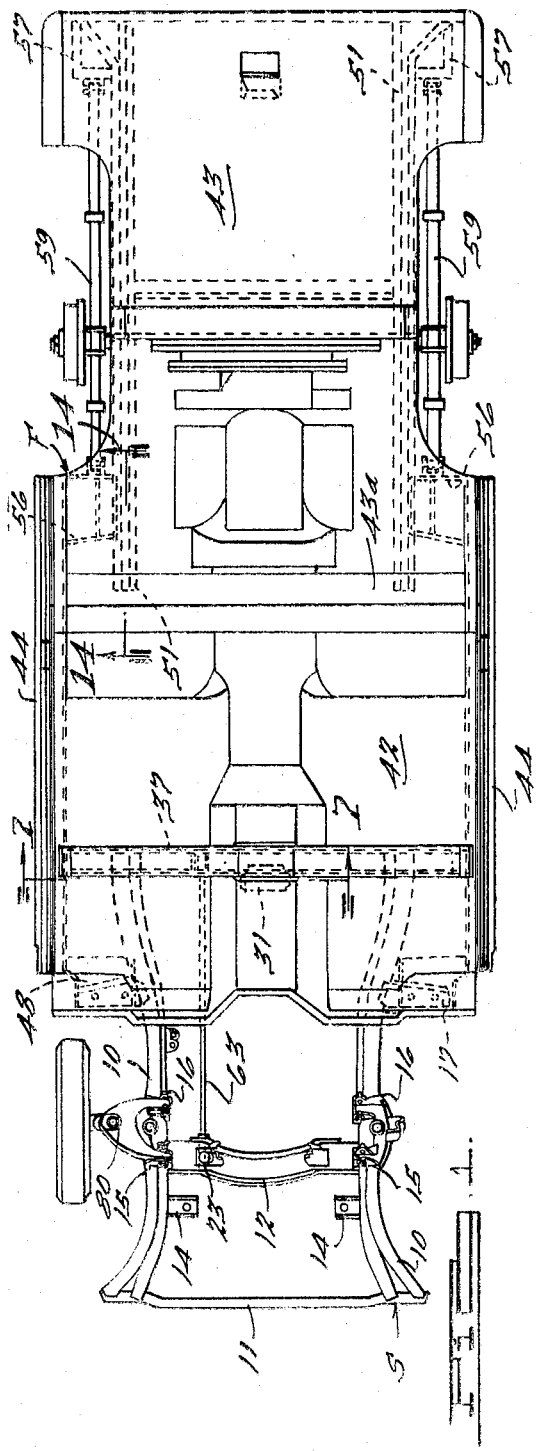
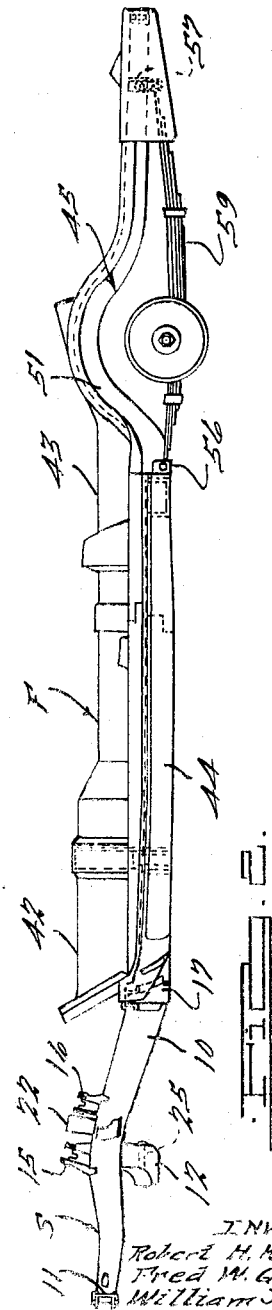
INVENTORS
Robert H. Kushler,
Fred W. Grant,
William J. Streetman,
Herman W. Smith,
Walter K. McPherson, Jr.
Maurice D. Karlstad, Jr.
Floyd L. Wilson.
Harness and Harris
ATTORNEYS.

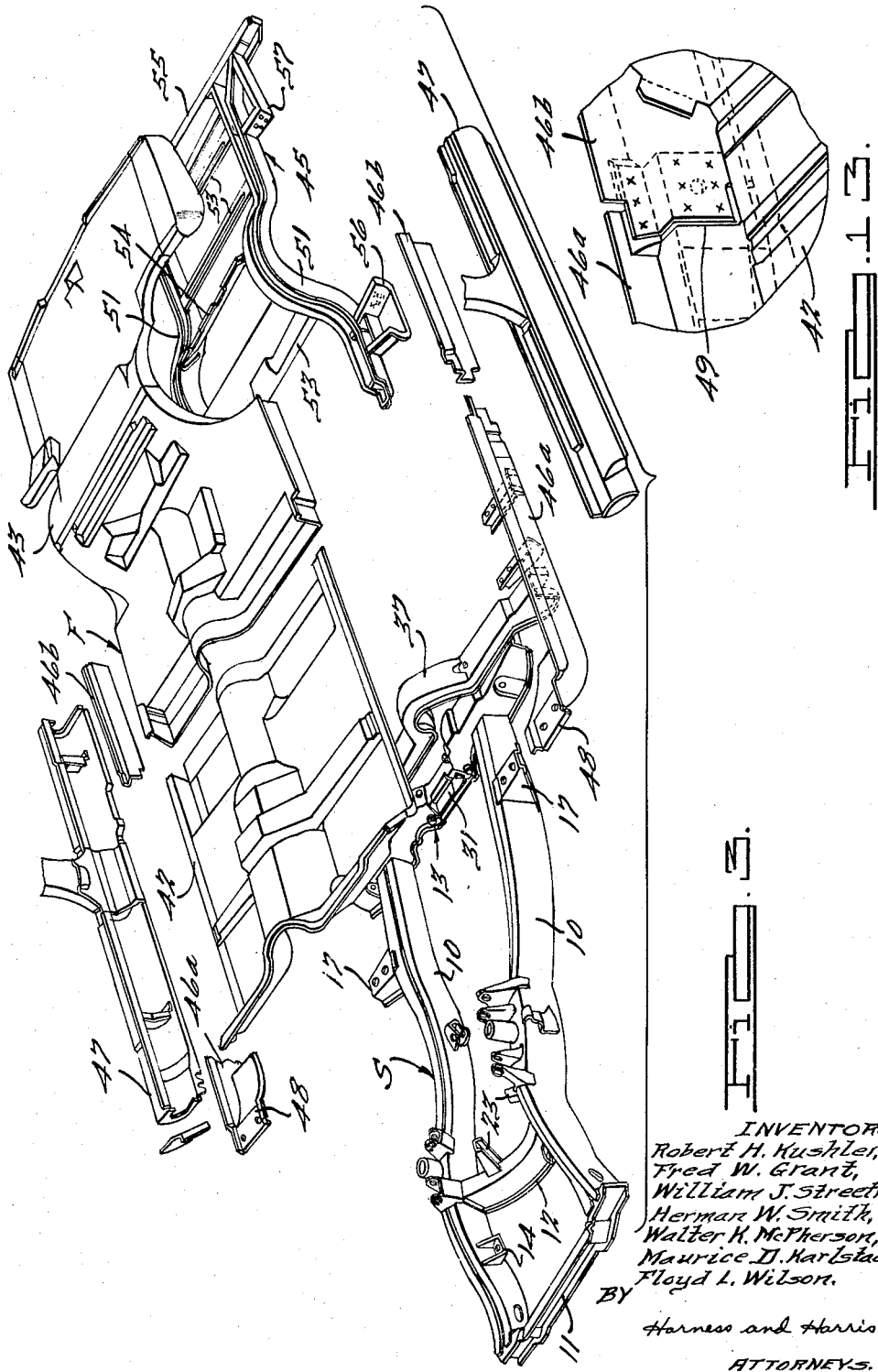

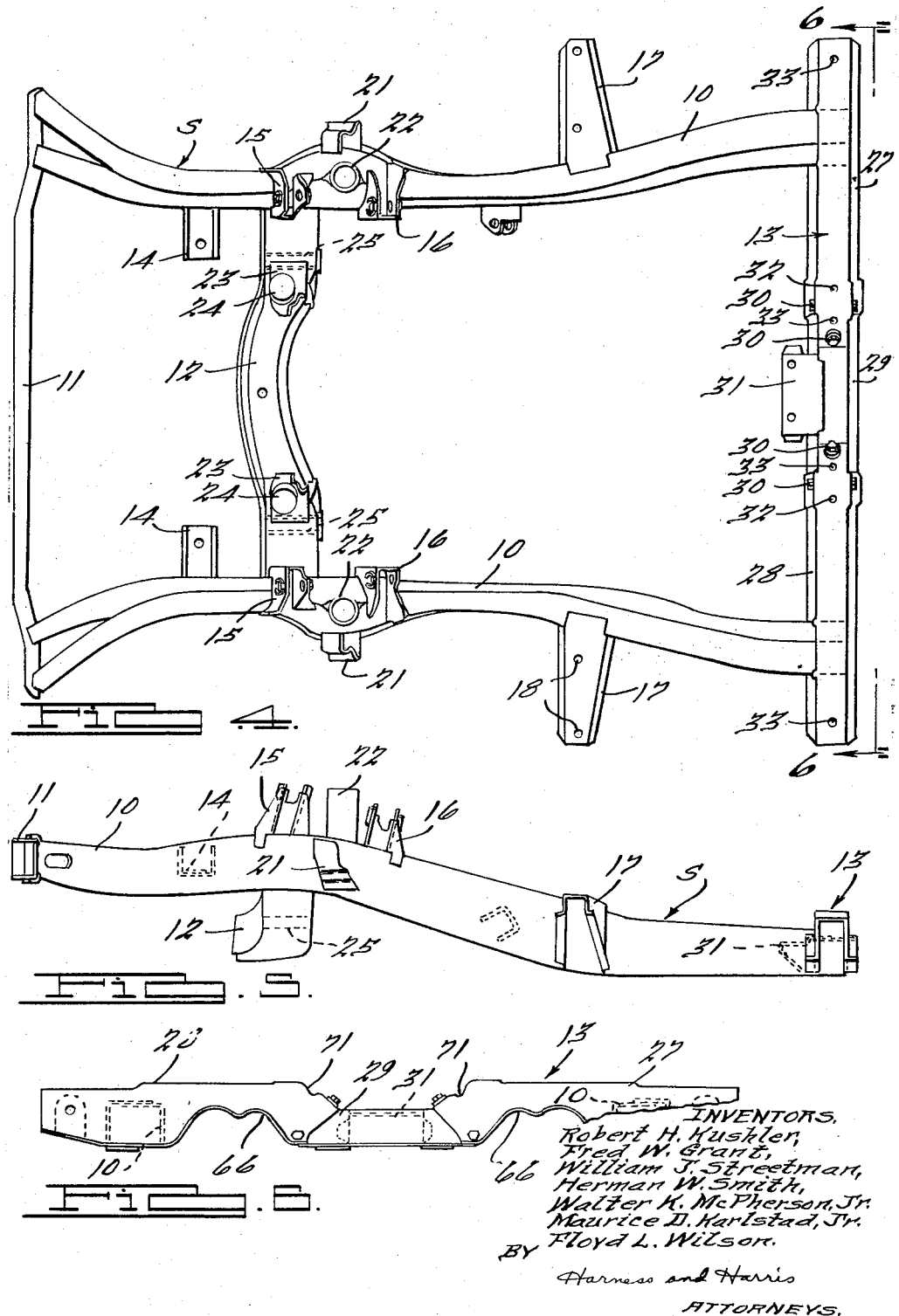

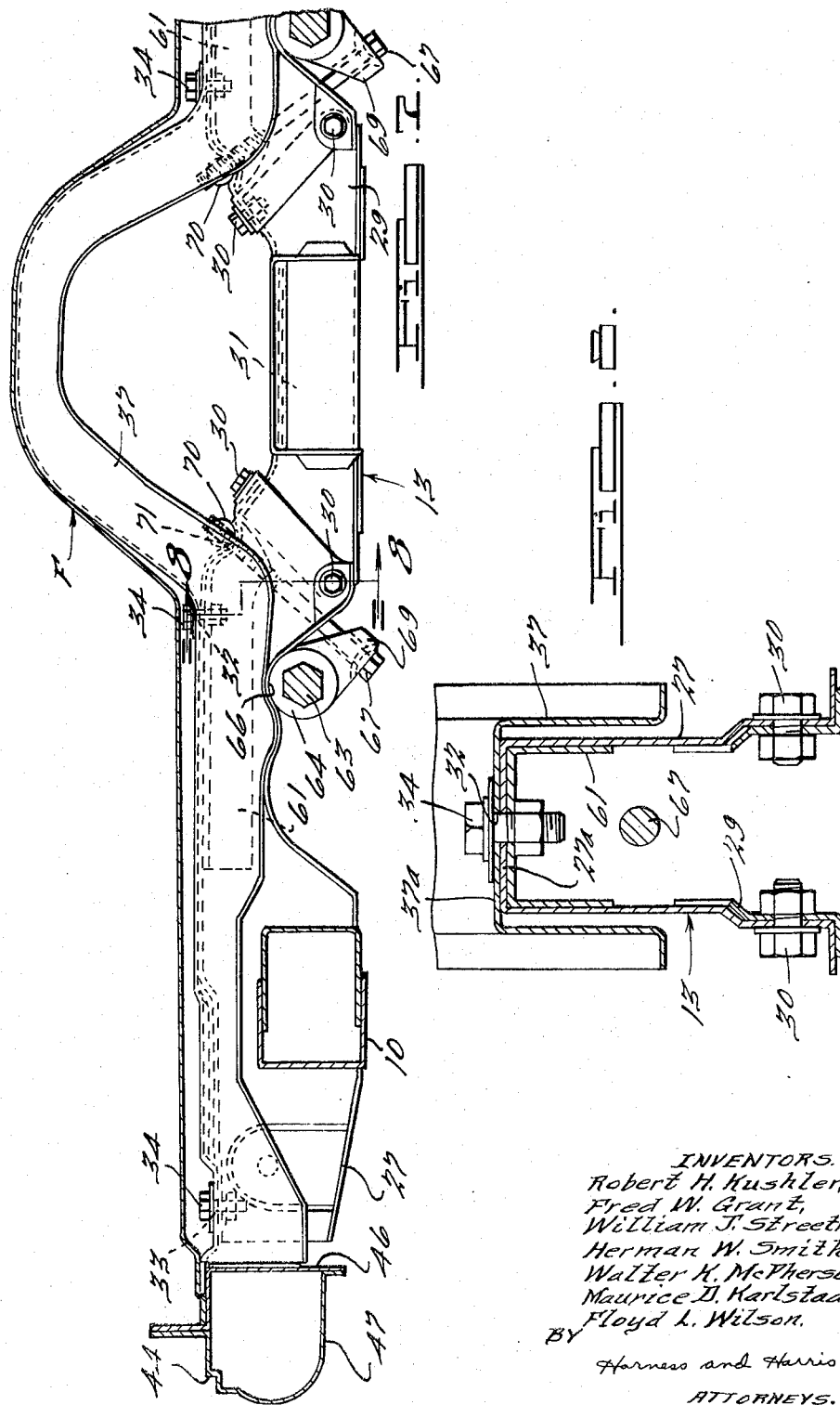

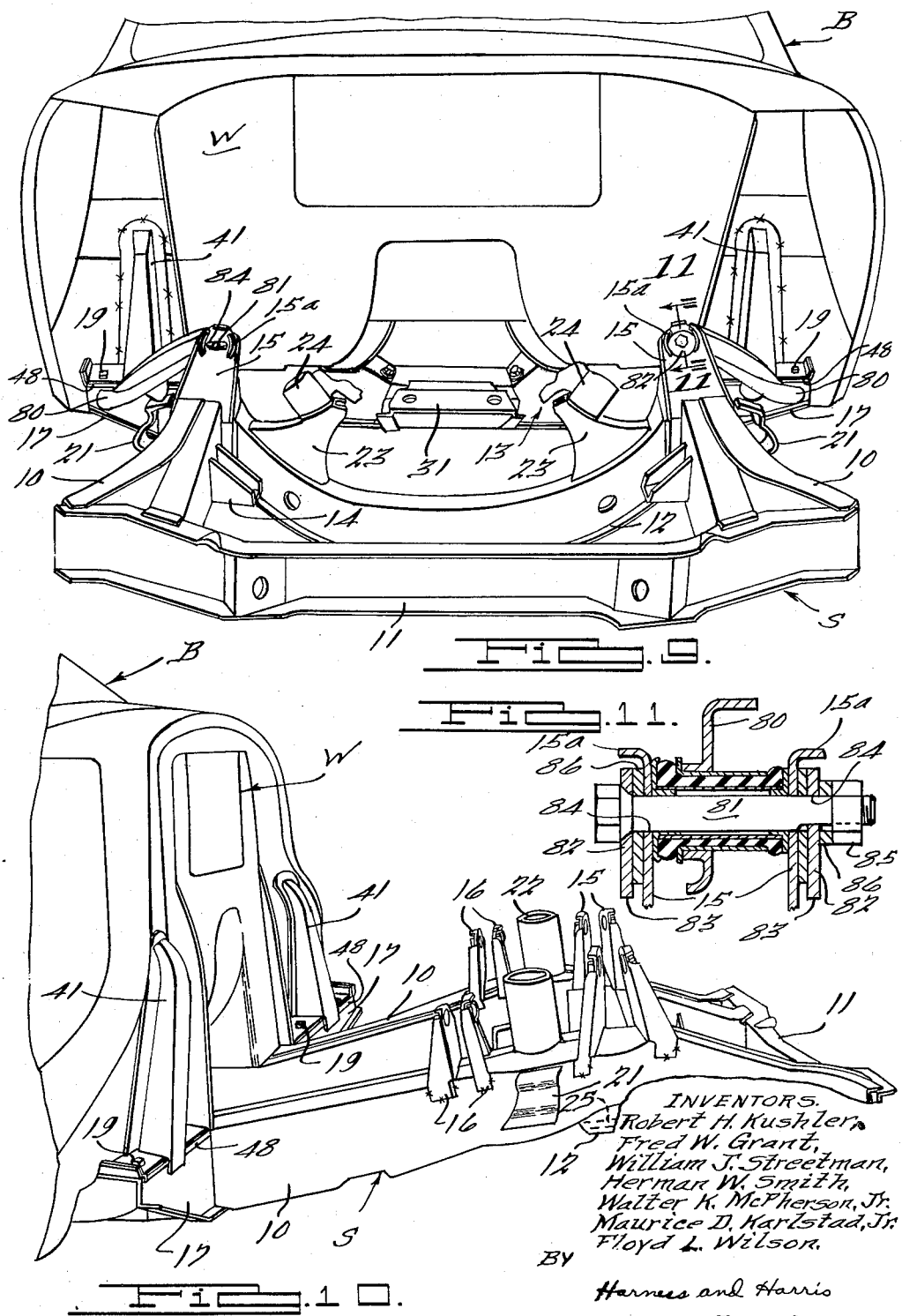

INVENTORS.
Robert H. Kushler,
Fred W. Grant,
William J. Streetman,
Herman W. Smith,
Walter K. McPherson, Jr.
Maurice D. Karlstad, Jr.
Floyd L. Wilson.
BY Harness and Harris
ATTORNEYS INVENTORS.
Robert H. Kushler,
Fred W. Grant,
William J. Streetman,
Herman W. Smith,
Walter K. McPherson, Jr.
Maurice D. Karlstad, Jr.
Floyd L. Wilson.
BY Harness and Harris
ATTORNEYS.

Oct. 4, 1960

R. H. KUSHLER ET AL 2,954,998

MOTOR VEHICLE STUB FRAME BODY

Filed Aug. 4, 1958

INVENTORS.
Robert H. Kushler,
Fred W. Grant,
William J. Streetman,
Herman W. Smith,
Walter K. McPherson, Jr.
Maurice D. Karlstad, Jr.
Floyd L. Wilson.

BY Harness and Harris
ATTORNEYS.

United States Patent Office 2,954,998
Patented Oct. 4, 1960

2,954,998

MOTOR VEHICLE STUB FRAME BODY

Robert H. Kushler, Plymouth, Fred W. Grant, Huntington Woods, William J. Streetman, Madison Heights, Herman W. Smith and Walter K. McPherson, Jr., Birmingham, Maurice D. Karlstadt, Jr., Warren, and Floyd L. Wilson, Dearborn, Mich., assignors to Chrysler Corporation, Highland Park, Mich., a corporation of Delaware Filed Aug. 4, 1958, Ser. No. 753,037

16 Claims. (Cl. 296—28)

This invention relates to a motor vehicle body and particularly to a vehicle body that utilizes a stub frame section at its front end portion.

It is a primary object of this invention to provide a new and improved manner of connecting a stub-frame unit to a so-called "unitized" body such that an improved type of vehicle body can be positioned at the lowest level consistent with required road clearance.

It is still another object of this invention to provide a stub frame supporting, "unitized" body wherein the interconnection between the stub frame and the body provides a novel type of reinforcement for the body.

It is a further object of this invention to provide a new and improved form of so-called "unitized" body that is composed of a plurality of interconnected sections that are arranged in a novel manner to give maximum strength and stability with minimum material.

It is still another object of this invention to provide a stub frame with a sectionalized cross member that has different sections mounting the engine support means and the associated wheel suspension spring means.

It is still a further object of this invention to provide a vehicle body floor pan having integral side sill elements that are interconnected with a plurality of floor pan cross members in such a manner that a plurality of interconnected, pan rigidifying ladder-type frame elements are formed on the floor pan.

It is still another object of this invention to provide a "unitized" body floor pan having wheel suspension support brackets that also function as means interconnecting the body sill members and a floor pan stiffener frame.

Other objects and advantages of this invention will be readily apparent from a reading of the following description and a consideration of the related drawing wherein:

Fig. 1 is a top plan view of the body floor pan and attached stub frame unit of a motor vehicle embodying this invention;

Fig. 2 is a side elevational view of the structure shown in Fig. 1;

Fig. 3 is an exploded perspective view of the structure shown in Figs. 1 and 2;

Fig. 4 is a top plan view of the stub frame unit forming part of this invention;

Fig. 5 is a side elevational view of the stub frame unit shown in Fig. 4;

Fig. 6 is an elevational view of the stub frame rear cross member, the view being taken as indicated by the arrows 6—6 of Fig. 4;

Fig. 7 is an enlarged sectional elevational view, taken along the line 7—7 of Fig. 1;

Fig. 8 is an enlarged sectional elevational view taken along the line 8—8 of Fig. 7;

Fig. 9 is a fragmentary front end elevational view of a vehicle body utilizing this invention;

Fig. 10 is a perspective view from the side of the vehicle front end shown in Fig. 9;

Fig. 11 is an enlarged sectional elevational view of the front wheel caster and camber adjusting means that is a part of the stub frame unit of this invention, the view being taken on line 11—11 of Fig. 9.

Fig. 13 is an enlarged fragmentary view of the inner sill member connection between the front and rear floor pan sections;

Fig. 15 is a perspective view of the ladder frame that is carried by the rear floor pan section;

Fig. 16 is a fragmentary perspective view of a portion of the rear floor pan section showing the mountings for the rear wheel shock absorbers;

Figure 12:
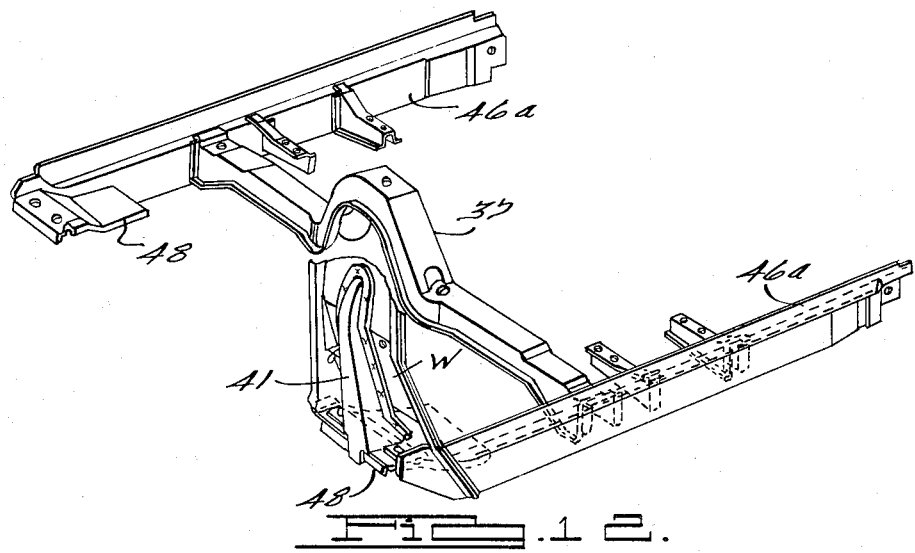
Fig. 12 is a fragmentary perspective view of the front floor pan section reinforcing inner sill members and cross member.

The invention disclosed in the aforenoted drawing figures and described hereafter provide a novel manner of reducing vehicle weight, lowering the car silhouette, reducing the number of separate body and chassis parts, improving vehicle assembly operations, rigidifying the resultant vehicle body unit, facilitating wheel caster and camber adjustment, reducing cost and obtaining a number of other advantages that will become obvious from the subsequent description.

Figs. 1–3 in particular show a portion of a motor vehicle comprising a front end stub frame unit S and a body floor pan unit F. The stub frame unit S, that supports the vehicle front wheels and the vehicle power plant (not shown), is a unit arranged to be detachably connected to a so-called "unitized" body unit by novel connecting means hereafter described. Because of the detachable connection means between the stub frame S and the vehicle body it is possible to pre-assemble the power plant and the front wheel assembly on the stub frame and then connect this front end assembly to the "unitized" body unit at the most opportune time. Such an arrangement lends itself to reduced vehicle build-up costs as well as reduced repair costs. Furthermore, because the vehicle "unitized" body can be built up as a complete unit irrespective of a conventional chassis frame the body can be readily assembled by the "gate-line" method of body assembly shown in J. D. Gordon Patent 2,779,092.

The stub frame S (see Figs. 4–6) comprises a pair of box-type side rails 10, 10 that are connected by front, intermediate and rear cross members 11, 12 and 13 respectively. Side rails 10, 10 each mount a radiator support bracket 14 and a pair of front wheel upper control arm pivot support brackets 15, 16. Each side rail 10, 10 also mounts, towards its rear end portion, an outwardly extending body support bracket 17 that is apertured at 18, 18 to receive body connector bolts 19, 19 (see Figs. 9 and 10). Each side rail 10, 10 also carries a front wheel control arm jounce bumper 21 and a shock absorber mounting housing 22.

Figure 17:
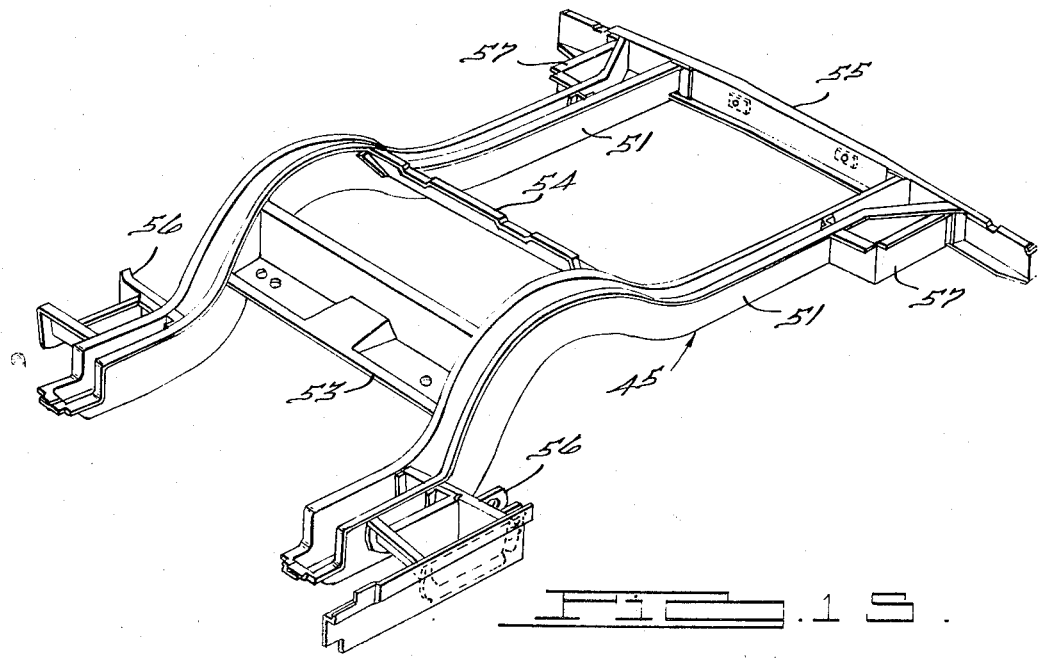
Fig. 17 is a perspective view of a front wheel suspension means that may be utilized with this invention.

The intermediate stub frame cross member 12 mounts at each side a front engine support bracket 23 that is adapted to seat a concentric sleeve-type engine support unit 24 (see Fig. 9) of the type shown in copending F. G. Sullivan patent application Serial No. 622,579, filed November 16, 1956. Intermediate cross member 12 also is provided with a pair of pivot pin bearings 25 that are adapted to pivotally support the front wheel lower control arms (see Fig. 17). This particular structure is shown in detail in copending patent application of John E. Collier et al., Serial No. 666,293, filed June 18, 1957.

The rear cross member 13 of the stub frame S is a dual function element that is an important part of the invention herein disclosed. This cross member 13 can be considered to comprise two fixed end portions 27 and 28 and a removable center section 29. The center section 29 is connected to the end sections 27, 28 by the bolt and nut connectors 30 (see Figs. 7 and 8). The center section 29 of the rear stub frame cross member 13 is thus removable from the stub frame and this is of considerable advantage in that this center section 29 mounts the rear engine support bracket 31. The rear engine support bracket is preferably of the sandwich type as shown in the aforementioned F. G. Sullivan copending application Serial No. 622,579. Obviously any other type of rear engine support bracket could also be used with the removable center section 29 of the rear cross member 13. Each of the fixed end sections 27 and 28 of the rear cross member 13 is provided with a pair of bolt receiving apertures 32, 33 that are adapted to receive connector bolts 34 (see Figs. 4, 7 and 8). The connector bolts 34 are used to join together in nested relationship the channel shaped cross members 13 of the stub frame and 37 of the vehicle body floor pan assembly F that is subsequently described in detail.

The vehicle body B, which is only shown in part in Figs. 9 and 10, includes the floor pan unit or assembly F that has connected to its forward end a fire wall W. Fire wall W includes a pair of vertically extending reinforcing channels 41 that are notched at their lower ends so as to seat upon and be connected to the outwardly extending body support brackets 17 of the stub frame S. The stiffening brackets 41 are preferably welded to the fire wall W and to the stub frame support brackets 17, as indicated on the drawings, but obviously bolt connectors or any equivalent connector means could be used to rigidly join the fire wall stiffener brackets 41 to the stub frame body support brackets 17.

The floor pan unit F (see Figs. 1 through 3) is essentially composed of two large front and rear pan assemblies, 42 and 43, respectively, that have mounted by welding or the like, on their undersides, the side sill elements 44 and cross member 37 that provide a substantially H-shaped ladder frame at the forward end of the floor pan unit and a similar type of substantially H-shaped ladder frame 45 is located at the rear end portion of the floor pan unit F. The side sill elements 44 cooperate with the stub frame members 10 to provide inner and outer, longitudinally extending, stiffening means along the forward portion of the floor pan unit F. The arrangement of the rails 10 and sill members 44 can be readily determined from Fig. 7. The sill members 44 comprise an inner member 46 and an outer member 47. Inner sill members 46 each carry a bracket plate 48 at the forward end thereof that is adapted to be connected to a stub frame body support bracket 17 as clearly shown in Figs. 1 and 12. As can be determined from Figs. 3 and 13, the inner sill members 46 are formed in two sections, a front section 46a carried by the front floor pan section 42 and a rear section 46b carried by the rear floor pan section 43. The joint structure between these two sections is shown in Fig. 13 and includes a connector plate 49 that is welded to the two floor pan carried sill members 46a and 46b to interconnect these members.

Figure 14:
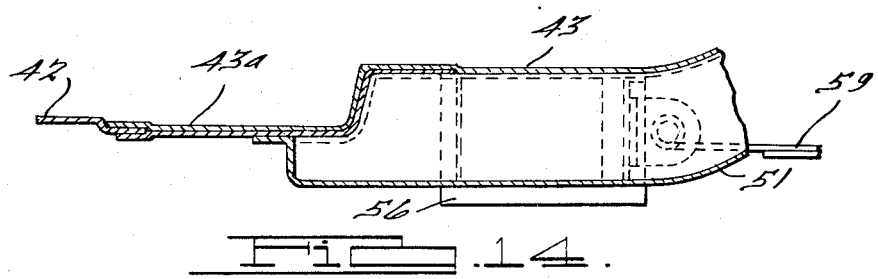
Fig. 14 is an enlarged fragmentary sectional elevational view, taken on the line 14—14 of Fig. 1, showing the overlapped welded connection between the front and rear floor pan sections and the connection of the ladder frame to the rear floor pan section.

The rear floor pan section 43 has mounted on its underside the ladder frame 45 that is shown in Fig. 15. Ladder frame 45 includes the longitudinally extending side rail members 51 that are connected together at longitudinally spaced points by the transversely extending cross rails 53, 54 and 55. The side rails 51 of the ladder frame 45 each have a pair of rear wheel suspension support brackets 56 and 57 mounted on their outer sides. In the instance shown the brackets 56, 57 support leaf spring suspension elements 59. Obviously the ladder frame 45 can also be used to support coil spring, air spring or any other type of rear wheel suspension elements. The ladder frame 45 is adapted to have the rear floor pan section 43 built up thereon and obviously rear floor pan sections of different overall lengths can be constructed on the same frame to provide for vehicles of different wheel base measurements. By varying the length of the front portion 43a (see Fig. 14) the variation in wheel bases can be easily secured while retaining the same front floor pan section 42.

One of the prime features of this invention relates to the nested interconnection between the rear cross member 13 (see Figs. 4 and 7) of the stub frame S and the cross member 37 (see Fig. 12) of the front floor pan section 42. It will be noted that the cross members 13 and 37 (see Fig. 8) are each channel-shaped members of different telescoping sizes that are arranged to have their channels open downwardly so that their respective web portions 27a or 28a and 37a can nest in face-to-face relationship. A reinforcing channel piece 61 can be added to each of the members 27 and 28 to build up the member 13 at its mid portion to obtain increased rigidity. The bolt connectors 34 will retain the nested members 37, 27 and 61 in assembled relationship. Because the channels open downwardly and are of such size that the stub frame cross member 13 can be nested within the floor pan member 37, the overall height of the vehicle body can be lowered several inches without any reduction in road or ground clearance. This is a very important consideration due to the present trend in vehicle styling to reduce the height of the car silhouette.

Another advantage of the particular nested interconnection between the stub frame rear cross member 13 and the floor pan front cross member 37 is that these members cooperate to rigidify the front end of the vehicle body. The interconnection between the nested channel members 13, 37 and the interconnection between the overlapped bracket plates 17, 41, 48 combine to give a very rigid interconnection between a stub frame and a "unitized" body that is a definite improvement over prior art connections between stub frames and unitized bodies.

In addition to providing a rigid interconnection between stub frame and unitized body that permits the vehicle body silhouette to be lowered, the sectionalized rear cross frame member 13 (see Fig. 7) also has certain other mechanical advantages that greatly facilitate assembly and repair of the vehicle. As previously pointed out the stub frame cross member 13 has a detachable center section 29 that can be removed when the bolt connectors 30, 30 are released. This permits the engine and/or transmission (not shown) to be readily removed from the vehicle for repair or replacement.

It will further be noted from Fig. 7 that the nested cross members 13, 37 are designed to provide the rear anchorage for the front wheel torsion bar spring elements 63. Bars 63 have sleeve cranks 64 fixed on their rear ends that are journaled in the arcuate formations 66 of the cross member fixed frame portions 27, 28. An adjusting screw 67 is connected to each crank arm 69 and threaded into a rod-type anchor nut 70 that seats in a depression 71 in the top of the cross member 13 (see Figs. 6 and 7). The cross member portions 27, 28 each have an aperture 73 (see Fig. 4) therein to receive the threaded end of the associated adjusting screw 67. The adjusting screws 67 provide for adjustment of the spring rate of the front wheel suspension means as is more clearly described in the aforenoted Collier et al. patent application Serial No. 666,293. From the drawings, particularly Fig. 7, it is thought to be obvious that the center portion 29 of the stub frame cross member 13 can be detached to remove the engine and/or transmission without affecting or requiring removal of the anchor means for the torsion bars 63. Likewise, the torsion bars 63 can be replaced or adjusted without in any way affecting the mounting of the engine and transmission on the cross member 13.

From Figs. 1-3 and 15 it will be noted that the unitized body B includes a floor pan F that is formed from a pair of floor pan sections 42, 43 each of which is stiffened by integral, ladder-type, frame sections mounted on the underside of the associated floor pan section. The front floor pan section 42 also has the fire wall W with its stiffening columns 41, 41 that are adapted to seat upon and rigidly connect the front floor pan section 42 to the brackets 17, 17 of the stub frame S. Front floor pan section 42 has a ladder-type frame (see Fig. 12) connected to its underside so as to provide an integral front end body and chassis portion. The body side sills 44 of floor pan section 42 cooperate with the front floor pan cross member 37 to provide a frame reinforced front floor pan section 42 that is tied into the stub frame S at its front end by means of the sill mounted bracket plates 48. The side sills 44 also connect the front floor pan section 42 to the rear floor pan section 43. Also, the rear ends of the side sills 44 are arranged to be tied into the rear ladder frame 45 by the suspension brackets 56 (see Figs. 1, 2 and 14). The rear wheel suspension brackets 57 also cooperate with the rear ladder frame 45 to stiffen the rear end of the rear floor pan section 43. Stiffening of the floor pan sections 42, 43 along their adjacent meeting edge portions is obtained by the overlapped joint that is shown in section in Fig. 14. This overlapped joint provides a transversely extending stiffening rib across the floor pan F at about its mid-length.

Fig. 16 is a perspective view of the rear portion of the body floor pan section 43 showing the shock absorber mountings 75 for the rear wheel shock absorbers. Stiffening plates 76 are mounted on the rear floor pan section 43 in the area of the shock absorber mounts 75 to rigidify this portion of floor pan section 43.

Fig. 11 is a sectional elevational view of the simplified means for adjusting the caster and camber of the front vehicle wheels. It will be noted that the upstanding brackets 15, 16 for the wheel upper control arms 80 (see Fig. 17) each mount a rotatable pivot pin 81. The pivot pin 81 has non-rotatably connected thereto a pair of eccentric disc cams 82. The peripheral edges 83 of the cams 82 are adapted to engage portions of the arcuate flanged shoulders 15a or 16a on the brackets 15, 16 respectively. When the pivot pins 81 are rotated the pins 81 are shifted transversely in the bracket slots 84 (see Fig. 9) as a result of the camming action between the cam surfaces 83 on cam discs 82 and the bracket flanges 15a or 16a. It is thought to be obvious that by separate rotatable adjustment of the pins 81 on the wheel support brackets 15 and 16 both the caster and camber of the front wheels can be readily obtained. No shims need to be removed or any other complicated procedure followed to quickly and accurately establish the proper caster and camber of the front wheels. When an adjustment is necessitated, it is a simple procedure to back off the lock nut 85 and then rotate the bolt-type pivot pin 81 until the cams 82 have caused the desired transverse shift of the associated spaced pivot portions of the control arms 80. After the desired adjustment has been obtained the lock nuts 85 are tightened up and the adjustment is complete. Suitable spacer washers and lockwashers 86 are used in this adjusting assembly but description thereof is not thought to be necessary.

Figure 18:
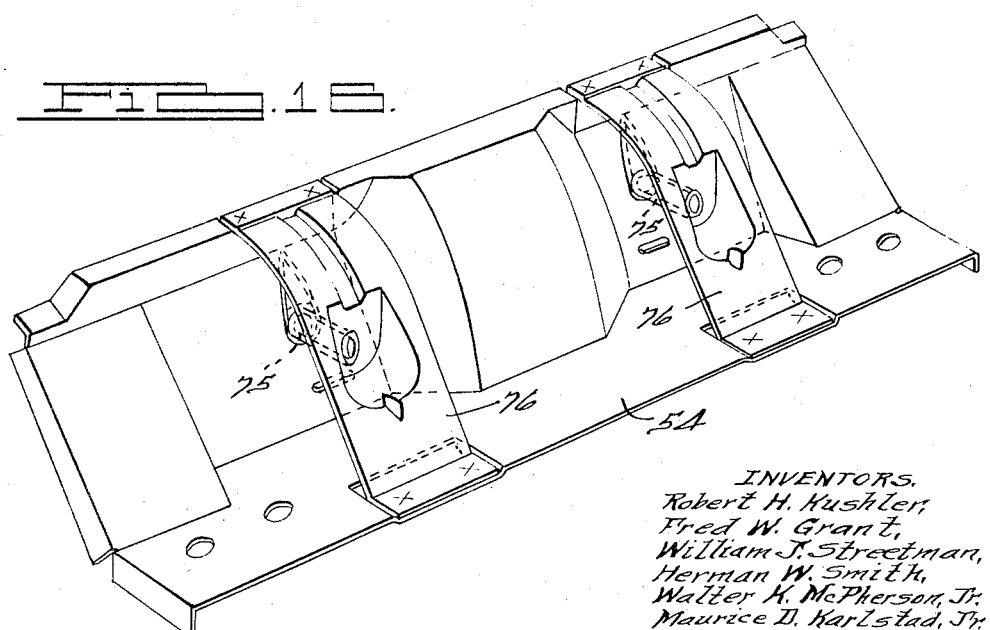
Fig. 18 is a perspective view of a complete body shell embodying this invention.
Figure 17:
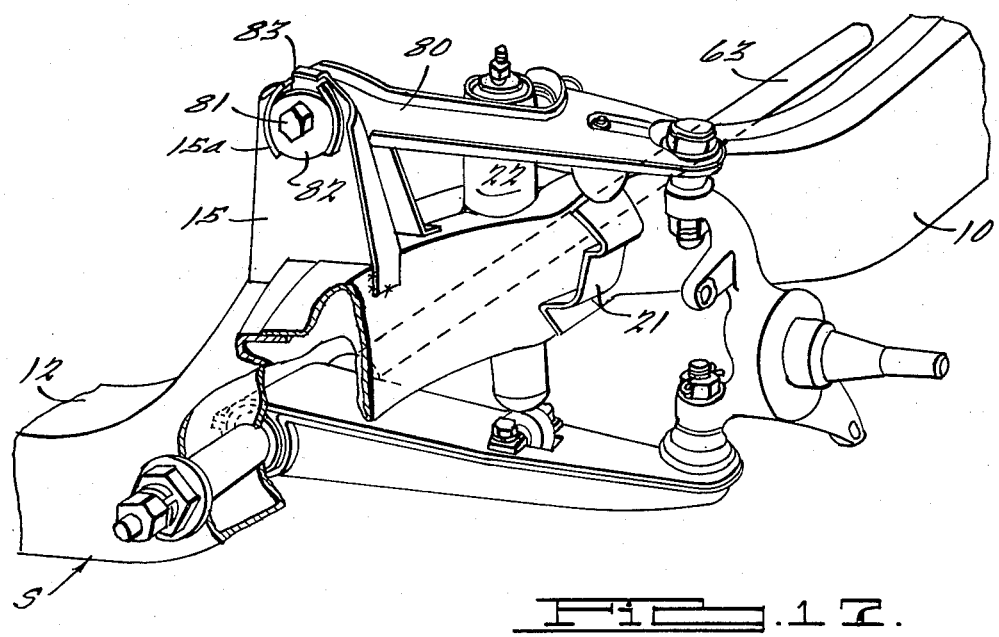
Figure 18:
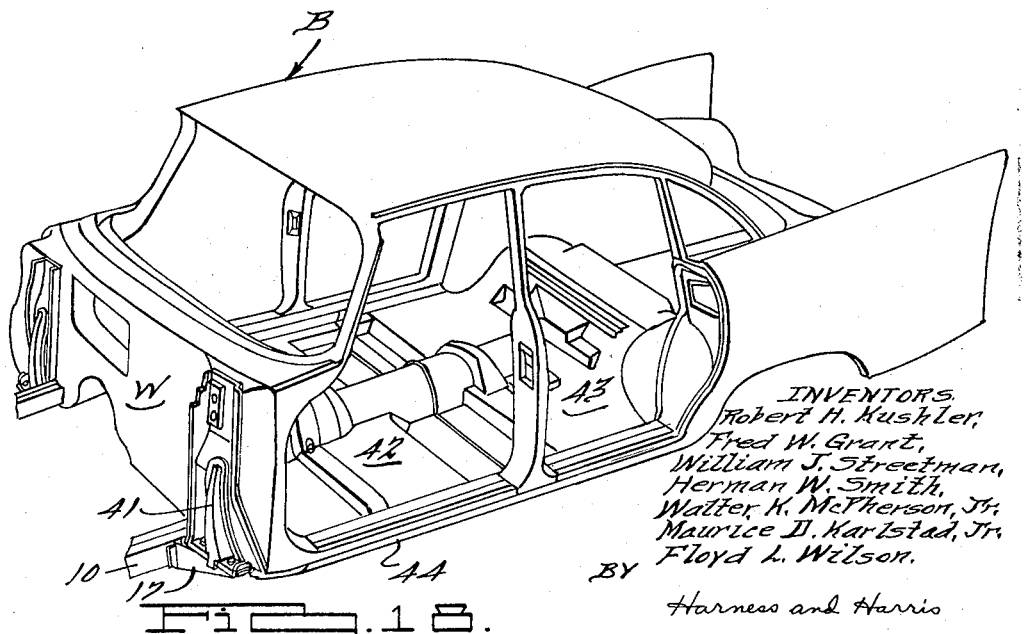

The particular body structure to be mounted on the floor pan F of this unitized body can be of various forms and for that reason no specific body structure has been shown associated with the floor pan F. Fig. 18 shows a typical body unit B that embodies this invention.

We claim:

1. A motor vehicle chassis stub frame comprising a pair of spaced, longitudinally extending, side rails interconnected by a forwardly located cross member and a rear end located cross member, said forwardly located cross member including front engine support mounting means and front wheel suspension support means, and resilient means to support said wheel suspension means extending longitudinally of said frame, said rear end located cross member including a detachable intermediate section that carries a rear engine support mounting means and other sections that support the resilient means for the front wheel suspension.

2. A motor vehicle chassis stub frame comprising a pair of spaced, longitudinally extending, side rails interconnected by a forwardly located cross member and a rear end located cross member, said forwardly located cross member including front engine support mounting means and front wheel suspension pivot support means, said rear end located cross member including a detachable intermediate section connected to the underside of the end sections of said rear cross member that carries a rear engine support mounting means, and transversely extending body support brackets carried by said side rails located intermediate said forwardly located and rear end located cross members said detachable intermediate section providing for dropping of the rear engine support without longitudinal movement thereof.

3. A motor vehicle chassis stub frame comprising a pair of spaced, longitudinally extending, side rails interconnected by a forwardly located cross member and a rear end located cross member, said forwardly located cross member including front engine support mounting means and front wheel suspension support means, and resilient means to support said wheel suspension means extending longitudinally of said frame, said rear end located cross member including a detachable intermediate section that carries a rear engine support mounting means and other sections that support the resilient means for the front wheel suspension, and transversely extending body support brackets carried by said side rails located intermediate said forwardly located and rear end located cross members.

4. A motor vehicle chassis stub frame comprising a pair of spaced longitudinally extending, side rails interconnected by a forwardly located cross member and a rear end located cross member, said forwardly located cross member including front engine support mounting means and front wheel suspension support means, and resilient means to support said wheel suspenson means extending longitudinally of said frame, said rear end located cross member including a detachable intermediate section that carries a rear engine support mounting means and other sections that support the resilient means for the front wheel suspension, said side rails including transversely extending, outwardly directed, body support brackets located intermediate said cross members and upstanding front wheel suspension pivot support brackets.

5. A motor vehicle chassis stub frame comprising a pair of spaced, longitudinally extending, side rails interconnected by a forwardly located cross member and a rear end located cross member, said forwardly located cross member including front engine support mounting means and front wheel suspension support means, and resilient means to support said wheel suspension means extending longitudinally of said frame, said rear end located cross member including a detachable intermediate section that carries a rear engine support mounting means and other sections that support the resilient means for the front wheel suspension, said side rails including transversely extending, outwardly directed, body support brackets located intermediate said cross members and upstanding front wheel suspension pivot support brackets, said last mentioned brackets including adjustable pivot support means to provide for adjustments of the front wheel caster and camber.

6. A unitized body comprising a floor pan unit including a pan assembly mounting on its underside, a forwardly located, longitudinally extending, substantially H-shaped, integral ladder frame and a rearwardly located longitudinally extending, substantially H-shaped, integral ladder frame, said forwardly located H-shaped frame mounting chassis frame attaching brackets on the forwardly positioned ends of the H-frame legs, said rearwardly located H-shaped frame having its leg portions located between the leg portions of the forwardly located H-shaped frame with the adjacent ends of said H-frame leg portions being interconnected by intermediate bracket means that provide support means for a vehicle rear wheel suspension.

7. A unitized body comprising a floor pan unit including a pan assembly mounting on its underside, a forwardly located, longitudinally extending, substantially H-shaped, integral ladder frame and a rearwardly located longitudinally extending, substantially H-shaped, integral ladder frame, said forwardly located H-shaped frame mounting chassis frame attaching brackets on the forwardly positioned ends of the H-frame legs, said rearwardly located H-shaped frame having its leg portions located between the leg portions of the forwardly located H-shaped frame with the adjacent ends of said H-frame leg portions being interconnected by intermediate bracket means that provide support means for a vehicle rear wheel suspension, said rearwardly located H-shaped frame including other bracket means at the rear ends of the leg portions thereof that rigidify the rear end of the floor pan unit and provide additional vehicle rear wheel suspension support means.

8. A unitized body comprising a floor pan unit including a pan assembly mounting, a forwardy located, longitudinally extending, substantially H-shaped, integral ladder frame and a rearwardly located longitudinally extending, substantially H-shaped, integral ladder frame, said forwardly located H-shaped frame mounting chassis frame attaching brackets on the forwardly positioned ends of the H-frame legs and a vertically extending, transversely disposed front wall body portion connected to the forward end of said floor pan unit and mounting vertically extending rigidifying columns that are fixedly mounted at their lower ends on said chassis frame attaching brackets.

9. In a motor vehicle, a chassis stub frame including longitudinally extending side rails interconnected by a forwardly and a rearwardly positioned cross member, said side rails including body mounting brackets located between said chassis frame cross members, and a unitized body connected to said stub frame comprising a floor pan unit having a pair of rigidifying frames mounted respectively on the front and rear portion of said floor pan unit, the rigidifying frame on the front portion of said floor pan unit including spaced, longitudinally extending, members providing body side sills that have frame mounting brackets on the forward end portions thereof connected to the stub frame body mounting brackets, a cross member on the rigidifying frame of the front floor pan portion arranged to nestingly receive and be connected to the rearwardly positioned cross member on said stub frame, the rigidifying frame on the rear portion of said floor pan unit comprising a pair of spaced, longitudinally extending, side members connected together by a plurality of transversely extending cross members, the forwardly extending portions of said side members being connected to the body side sills.

10. In a motor vehicle, a chassis stub frame including longitudinally extending side rails interconnected by a forwardly and a rearwardly positioned cross member, said side rails including body mounting brackets located between said chassis frame cross members, and a unitized body connected to said stub frame comprising a floor pan unit having a pair of rigidifying frames mounted respectively on the front and rear portion of said floor pan unit, the rigidifying frame on the front portion of said floor pan unit including spaced, longitudinally extending, members providing body side sills that have frame mounting brackets on the forward end portions thereof connected to the stub frame body mounting brackets, a cross member on the rigidifying frame of the front floor pan portion arranged to nestingly receive and be connected to the rearwardly positioned cross member on said stub frame, the rigidifying frame on the rear portion of said floor pan unit comprising a pair of spaced, longitudinally extending, side members connected together by a plurality of transversely extending cross members, the forwardly extending portions of said side members being connected to the body side sills and bracket means carried by said floor pan unit rigidifying frames providing mounting means for the vehicle rear wheel suspension means.

11. In a motor vehicle, a chassis stub frame including longitudinally extending side rails interconnected by a forwardly and a rearwardly positioned cross member, said side rails including body mounting brackets located between said chassis frame cross members, and a unitized body connected to said stub frame comprising a floor pan unit having a pair of rigidifying frames mounted respectively on the front and rear portions of said floor pan unit, the rigidifying frame on the front portion of said floor pan unit including spaced, longitudinally extending, members providing body side sills that have frame mounting brackets on the forward end portions thereof connected to the stub frame body mounting brackets and a cross member of downwardly opening, channel-shaped cross-sections on the rigidifying frame of the front floor pan portion arranged to nestingly receive and be connected to the rearwardly positioned cross member on said stub frame.

12. In a motor vehicle, a chassis stub frame including longitudinally extending side rails interconnected by a forwardly and a rearwardly positioned cross member, said side rails including body mounting brackets located between said chassis frame cross members, and a unitized body connected to said stub frame comprising a floor pan unit having a pair of rigidifying frames mounted respectively on the front and rear portions of said floor pan unit, the rigidifying frame on the front portion of said floor pan unit including spaced, longitudinally extending, members providing body side sills that have frame mounting brackets on the forward end portions thereof connected to the stub frame body mounting brackets and a cross member of downwardly opening, channel-shaped, cross-section on the rigidifying frame of the front floor pan portion arranged to nestingly receive and be connected to the rearwardly positioned cross member on said stub frame, said stub frame rear cross member having a detachable intermediate portion and the overlying portion of the floor pan rigidifying frame cross member being upwardly arched to provide a tunnel therebetween to receive a portion of the vehicle drive train.

13. In a motor vehicle, a chassis stub frame including longitudinally extending side rails interconnected by a forwardly and a rearwardly positioned cross member, said side rails including body mounting brackets located between said chassis frame cross members, and a unitized body connected to said stub frame comprising a floor pan unit having a rigidifying frame mounted thereon, the rigidifying frame at the front portion of said floor pan unit including spaced, longitudinally extending, members providing body side sills that have frame mounting brackets on the forward end portions thereof connected to the stub frame body mounting brackets and a cross member on the rigidifying frame located rearwardly of the forward end portions thereof arranged to nestingly receive and be connected to the rearwardly positioned cross member on said stub frame, the rigidifying frame at the rear portion of said floor pan unit comprising a pair of inwardly spaced, longitudinally extending, side members connected together by a plurality of transversely extending cross members, the forwardly extending portions of said side members being connected to the body side sills.

14. In a motor vehicle, a chassis stub frame including longitudinally extending side rails interconnected by a forwardly and a rearwardly positioned cross member, said side rails including body mounting brackets located between said chassis frame cross members, and a unitized body connected to said stub frame comprising a floor pan unit having a rigidifying frame mounted thereon, the rigidifying frame at the front portion of said floor pan unit including spaced, longitudinally extending, members providing body side sills that have frame mounting brackets on the forward end portions thereof connected to the stub frame body mounting brackets and a cross member on the rigidifying frame located rearwardly of the forward end portions thereof arranged to nestingly receive and be connected to the rearwardly positioned cross member on said stub frame, the rigidifying frame at the rear portion of said floor pan unit comprising a pair of inwardly spaced, longitudinally extending, side members connected together by a plurality of transversely extending cross members, the forwardly extending portions of said side members being connected to the body side sills, said body also including a transversely extending, vertically disposed fire wall connected to the front end of said floor pan unit with said fire wall including vertically extending rigidifying brackets connected to said stub frame body mounting brackets.

15. In a motor vehicle, a chassis stub frame including longitudinally extending side rails interconnected by a forwardly and a rearwardly positioned cross member, said side rails including body mounting brackets located between said chassis frame cross members, said forwardly positioned cross member providing front wheel suspension support means and said rearwardly positioned cross member including a detachable center section with an engine support means thereon, resilient means to support said wheel suspension means extending longitudinally of the stub frame a unitized body connected to said stub frame comprising a floor pan unit having a rigidifying frame mounted thereon, the rigidifying frame at the front portion of said floor pan unit including spaced, longitudinally extending, members providing body side sills that have stub frame mounting brackets on the forward end portions thereof connected to the stub frame body mounting brackets, and a channel-type cross member on the rigidifying frame at the front portion of said floor pan unit arranged to nestingly receive and be connected to the rearwardly positioned cross member on said stub frame, said channel-shaped cross member having portions thereof formed to support the resilient means for the front wheel suspension, said rigidifying frame at the rear portion of said floor pan unit comprising a pair of spaced, longitudinally extending, side members connected together by a plurality of transversely extending cross members with the forwardly extending portions of said rearwardly located side members being connected to the body side sills.

16. In a motor vehicle, a chassis stub frame including longitudinally extending side rails interconnected by a forwardly and a rearwardly positioned cross member, said side rails including body mounting brackets located between said chassis frame cross members, said forwardly positioned cross member providing front wheel suspension support means and said rearwardly positioned cross member including a detachable center section with an engine support means thereon, resilient means to support said wheel suspension means extending longitudinally of the stub frame a unitized body connected to said stub frame comprising a floor pan unit having a rigidifying frame mounted thereon, the rigidifying frame at the front portion of said floor pan unit including spaced, longitudinally extending, members providing body side sills that have stub frame mounting brackets on the forward end portions thereof connected to the stub frame body mounting brackets, and a channel-type cross member on the rigidifying frame at the front portion of said floor pan unit arranged to nestingly receive and be connected to the rearwardly positioned cross member on said stub frame, said channel-shaped cross member having portions thereof formed to support the resilient means for the front wheel suspension, said rigidifying frame at the rear portion of said floor pan unit comprising a pair of spaced, longitudinally extending, side members connected together by a plurality of transversely extending cross members with the forwardly extending portions of said rearwardly located side members being connected to the body side sills and a substantially vertically extending fire wall mounted on the front end of said floor pan unit having rigidifying columns thereon that are connected to the stub frame body supporting brackets and the side sill mounted stub frame mounting brackets.

References Cited in the file of this patent

UNITED STATES PATENTS

| | | |
|---|---|---|
| 1,845,393 | Bock | Feb. 16, 1932 |
| 2,022,111 | Evans | Nov. 26, 1935 |
| 2,139,750 | Hicks | Dec. 13, 1938 |
| 2,654,634 | Zummach | Oct. 6, 1953 |
| 2,669,462 | Toncray et al. | Feb. 16, 1954 |
| 2,827,327 | Lindsay | Mar. 18, 1958 |